(12) United States Patent
Ezumi et al.

(10) Patent No.: US 6,474,533 B1
(45) Date of Patent: *Nov. 5, 2002

(54) FRICTION STIR WELDING METHOD

(75) Inventors: Masakuni Ezumi, Kudamatsu (JP); Kazusige Fukuyori, Kudamatsu (JP); Yoshihiko Ina, Kudamatsu (JP); Tetsuya Matsunaga, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/716,373

(22) Filed: Nov. 21, 2000

(30) Foreign Application Priority Data

Nov. 24, 1999 (JP) ............................................. 11-332855

(51) Int. Cl.⁷ .............................................. B23K 20/12
(52) U.S. Cl. ..................................... 228/112.1; 228/212
(58) Field of Search ............................... 228/112.1, 2.1, 228/114.5, 119, 234.1; 156/73.5

(56) References Cited

U.S. PATENT DOCUMENTS

| | | | | |
|---|---|---|---|---|
| 6,050,474 A | * | 4/2000 | Aota et al. | |
| 6,193,137 B1 | * | 2/2001 | Ezumi et al. | |
| 6,276,591 B1 | * | 8/2001 | Kawasaki et al. | |

FOREIGN PATENT DOCUMENTS

| | | |
|---|---|---|
| EP | 797043 | 9/1997 |
| FR | 0 893 190 A2 | 1/1999 |
| JP | 9-221024 | 8/1997 |
| JP | 10-201189 | 7/1998 |
| JP | 11/28581 | 2/1999 |
| JP | 11-28583 | 2/1999 |
| JP | 11-267859 | 10/1999 |
| JP | 11-300481 | 11/1999 |

* cited by examiner

Primary Examiner—M. Alexandra Elve
Assistant Examiner—Jonathan Johnson
(74) Attorney, Agent, or Firm—Antonelli, Terry, Stout & Kraus, LLP.

(57) ABSTRACT

Abutted portion of face plates 12b and 22b of frame members 10 and 20 are friction stir welded. With the abutting, a projecting portion 20c of an end portion of the face plate 20b of the frame member 20 is inserted into a recessed portion 12c of an end portion of the face plate 12b of the frame member 10. By this engagement, the outer faces on one face side of the face plates 12b and 20b form a smooth surface, so that at the joined edges there is no step. Next, a rotary tool 250 is inserted into the gas between the abutted plates from the side of the raised portions 16 and 26 side of the face plates 12b and 20b, while the other faces 12bc and 20bc of the face plates 12b and 20b, are supported flatly on a bed during the friction stir welding. Accordingly, the welding of the engaged plates can be carried out without any step-wise difference.

10 Claims, 3 Drawing Sheets

FRICTION STIR WELDING METHOD

BACKGROUND OF THE INVENTION

The present invention relates to a friction stir welding method which is suitable for joining extruded frame members made of an aluminum alloy, such as are used in the manufacture of a railway vehicle or a building structure, for example.

Friction stir welding is a method in which, by rotating a round rod (called "a rotary tool") which is inserted into a joint between the members being joined and moving the rotary tool along the line of the joint between the extruded frame members, the friction stir welding portion is heated, softened and plastically fluidized, and a solid joint is produced. The rotary tool is comprised of a small diameter portion which is inserted into the welding joint and a large diameter portion which is positioned outside of the small diameter portion of the rotary tool. The small diameter portion and the large diameter portion of the rotary tool have the same axis. A boundary between the small diameter portion and the large diameter portion of the rotary tool is inserted a little into the welding joint during welding. The above stated technique is disclosed, for example, in Japanese application patent laid-open publication No. Hei 9-309164 (EP 0797043 A2).

As seen in FIG. 9 of Japanese application patent laid-open publication No. Hei 9-309164 (EP 0797043 A2), the joining of two faces of hollow extruded frame members is carried out from one of the two faces of the hollow extruded frame member. Namely, the plates of one side face of each member are abutted, and from the other side of the other member, a friction stir welding is carried out on the abutted plates. The outer face sides of said plates are joined to provide a flat surface. An end portion of the plate of the other face side is orthogonal to the thickness direction. Further, as seen in FIG. 7 of Japanese application patent laid-open publication No. Hei 9-309164 (EP 0797043 A2), by joining members each having a raised portion, a good friction stir welding is carried out.

As shown in FIG. 9 of the above stated Japanese application patent laid-open publication No. Hei 9-309164 (EP 0797043 A2), a case where two plates (extruded frame members) having a long size, for example about 25 m, are abutted and are welded is taken into the consideration. During the welding, while the abutting portions of the plates are pressed down from above, the friction stir welding is carried out. The means for pressing is a pressing-down metal fitting means or a roller which moves together with the rotary tool. Further, after the two plates have been welded temporarily at spaced points with a predetermined pitch, by pressing down on the two frame members, the friction stir welding is carried out.

When the plates are long in size, there is a possibility that the end portion of the plate is deformed to have a waveform shape in the longitudinal direction (warp). In this case, as shown in FIG. 7 of the accompanying drawings, in the abutted portion, the ends of the two plates B1 and B2 will meet with a step-wise difference in an upper and lower direction. This step-wise difference can be removed by pressing down from above on the two members. However, to eliminate the step-wise difference, it is necessary to provide the pressing-down metal fixing means with a small pitch, with a result that the apparatus becomes high in cost.

Further, before the temporary welding and the friction stir welding can be carried out, it is necessary to eliminate the step-wise difference, or else there will be a problem. In this regard, when a step-wise difference remains after welding, it is impossible to remove the step-wise difference.

SUMMARY OF THE INVENTION

An object of the present invention is to abut plates to be welded in such a way that a step-wise difference does not exist at the welding joint when welding is carried out.

The above-stated object can be attained by a friction stir welding method comprising the steps of: inserting a projecting portion on an end of a plate of a first frame member into a recessed portion in an end of a plate of a second frame member to abut said frame members so as to form a welding joint; and inserting a rotary tool into the welding joint from one face of the members and carrying out friction stir welding of the other face of the members.

The above-stated object can be attained by a method of manufacturing a structural body comprising the steps of: inserting a projecting portion on an end of a plate of a first frame member into a recessed portion in an end of a plate of a second frame member to abut said frame members to as to form a welding joint; inserting a rotary tool into the welding joint from one face of the members and carrying out a friction stir welding of the other face of the members; and positioning a face of the one side of a structure which has been obtained by the friction stir welding as an outer face of a structural body for manufacturing the structural body.

The above-stated object can be attained by a method of manufacturing a car body comprising the steps of: inserting a projecting portion on an end of a plate of a first frame member into a recessed portion in an end of a plate of a second frame member to abut said frame members so as to form a welding joint; inserting a rotary tool into the welding joint from one face of the members and carrying out a friction stir welding of the other face of the members; and positioning a face of the one side of a structure which has been obtained by the friction stir welding as an outer face of a car body for manufacturing the car body.

The above-stated object can be attained by a friction stir welding of frame members wherein, a recessed portion is provided at an end face representing the thickness direction of a plate.

The above-stated object can be attained by a friction stir welding of frame members wherein, a projecting portion is provided at an end face representing the thickness direction of a plate.

DESCRIPTION OF THE INVENTION

One embodiment of a structural body and a method of manufacturing the structural body according to the present invention will be explained with reference to FIG. 1 to FIG. 6.

Figure 6:
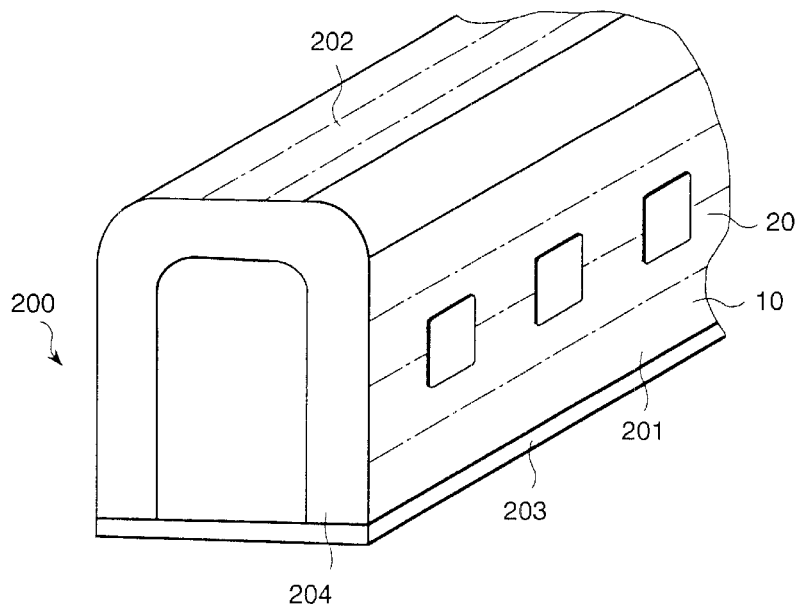
FIG. 6 is a perspective view showing a car body of a railway vehicle.
Figure 7:
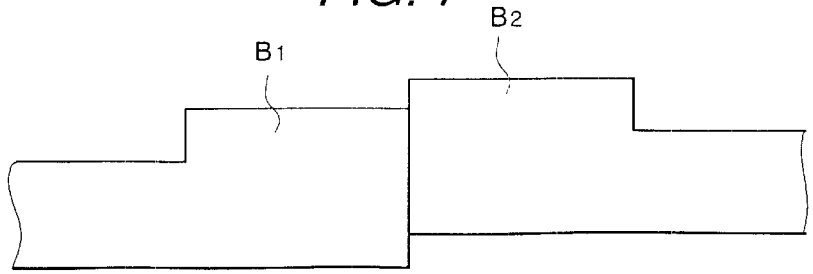
FIG. 7 is a longitudinal cross-sectional view showing an abutting portion between two members to be welded according to the prior art.

Referring first to FIG. 6, a car body 200 is comprised of a side structure 201 constituting a side face of the car body 200, a roof structure 202 constituting a roof of the car body 200, a stand frame 203 constituting the floor of the car body 200, and an end structure 204 constituting an end portion of the car body 200. Each of the side structure 201, the roof structure 202, and the end frame 203 is constituted respectively by joining plural extruded frame-members. The longitudinal direction of each extruded frame member extends in the longitudinal direction of the car body 200, except for the end frame 203, and each extruded frame member is a hollow frame member made of an aluminum alloy.

The constitution and method of joining a hollow extruded frame member 10 and a hollow extruded frame member 20 for constituting the side structure 201 will be explained. Other portions and other structures which make up the car body 200 are formed in a similar manner.

Figure 5:
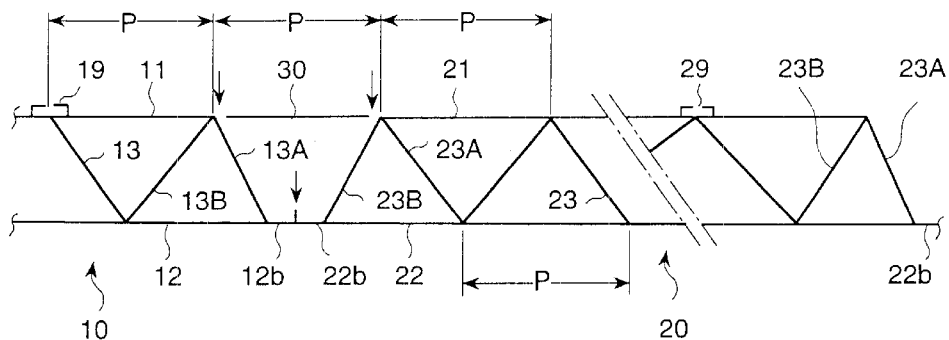
FIG. 5 is a diagram schematically showing a pair of hollow frame members to be welded according to the present invention.

As seen in FIG. 5, the hollow frame member 10 and the hollow extruded frame member 20 are comprised of two sheet face plates 11, 12 and 21, 22 and truss-shaped plural ribs 13 and 23. The two sheet face plates 11 and 12 (the two sheet face plates 21 and 22) are disposed substantially in parallel. The pitch of the truss structure formed by the ribs 13 and 23 is the same. The truss structure is constituted by the ribs 13 and 23 and a center line in the direction of the plate thickness of the face plates 11 and 12 and the face plates 21 and 22. An apex exists at the inner surface of the face plates 11 and 12 and the face plates 21 and 22.

In the vicinity of the apex of the truss structure on an inner side of the railway car, rails 19 and 29 for installing machines and apparatuses are provided integrally. The rails 19 and 29 are comprised of two L-shaped members. The rails 19 and 20 provide seats for installing the machines and apparatuses such as interior mounting plates and chairs, for example.

End portions 12b and 22b of the face plates 12 and 22, which are positioned on the outer face side of the car body, project toward the adjacent hollow frame members 20 and 10, respectively, beyond the end portions of the face plates 11 and 21 on the car body side. By abutting the projecting end portions of the face plates 12b and 22b against each other, friction stir welding can be carried out. The plate thickness of each of the projecting end portions 12b and 22b is thicker than the other portions of the face plates 12 and 22.

The hollow frame members 10 and 20 are mounted on a bed with the face plates 12 and 22 facing down and with the face plates 11 and disposed to face up. By inserting a rotary tool into the joint formed at the abutted portion from above, as seen by the arrow in FIG. 5, friction stir welding is carried out. Thus, the friction stir welding is carried out from the side which represents the inside of the car.

Figure 4:
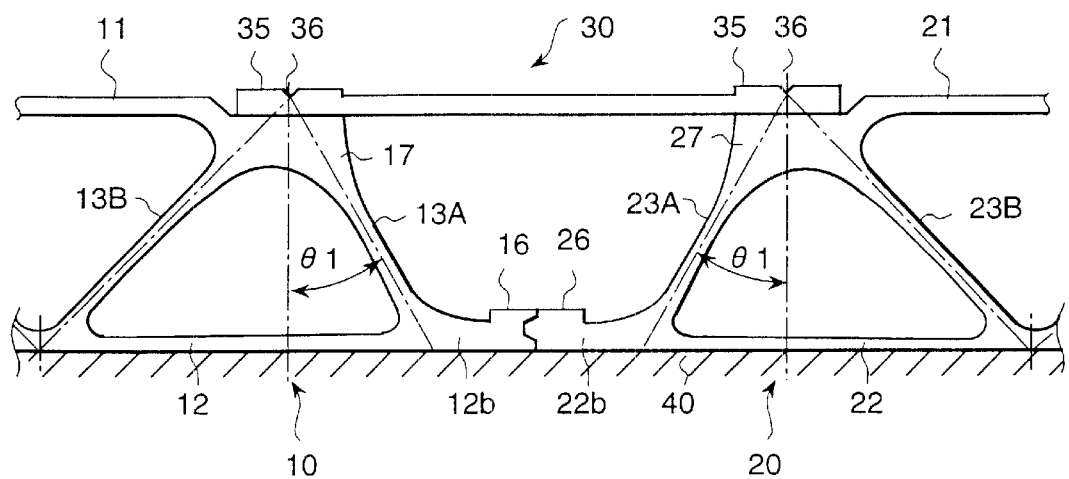
FIG. 4 is a longitudinal cross-sectional view showing a pair of abutting hollow frame to be welded according to the present invention.

As seen in FIG. 4, the end portions 12b and 22b have raised portions 16 and 26 which project toward the car inner side (namely, toward the face plates 11 and 21). The width and height of each of the raised portions 16 and 26 are substantially the same.

The end portion of the face plates 11 and 21 on the car inner side, which are spaced from each other, are connected through a connection member 30. One end portion of the connection member 30 is mounted (overlapped) on a seat 27 which is provided on the apex of the end truss structure of the frame member 20, and the other end portion of the connection member 30 is mounted (overlapped) on a seat 17 which is provided on the apex of the end truss structure of the frame member 10. The seat 27 is arranged at an intersecting point between the rib 23A and the rib 23B. The seat 17 is arranged at an intersecting point between the rib 13A and the rib 13B. At a center of the width of the seat 27, the above-stated intersecting point is arranged. At a center of the width of the seat 17, the above-stated intersecting point is arranged. Namely, the apex of the truss of the end portion of frame member 20 is arranged at the central portion of the width of the seat 27, and the apex of the truss of the end portion of the frame member 10 is arranged at the central portion of the width of the seat 17. The width of the seat 27 is similar to the width of the raised portion 35 at one end of the connection member 30, and the width of the seat 17 is similar to the width of the raised portion 35 at the other end of the connection member 30.

The seat 27 is recessed from the outer face of the face plate 21, and the seat 17 is recessed from the outer face of the face plate 11. Thus, the end portion 27 of the face plate 21 is inclined as a groove for the arc welding thereof to the connection member 30, and the end portion 17 of the face plate 11 is inclined as a groove for the arc welding thereof to the connection member 30. The connection member 30 is arranged to form a continuous surface with the plate plates 11 and 21. For this reason, the seat 27 (17) is recessed by approximately the plate thickness of the face plate 21 (11) relative to the outer face of the face plate 21 (11). The central portion, except for both end portions of the connection member 30, is formed as a plate 31, and the plate thickness of the plate is substantially the same to the plate thickness of the face plate 21 (11).

Figure 3:
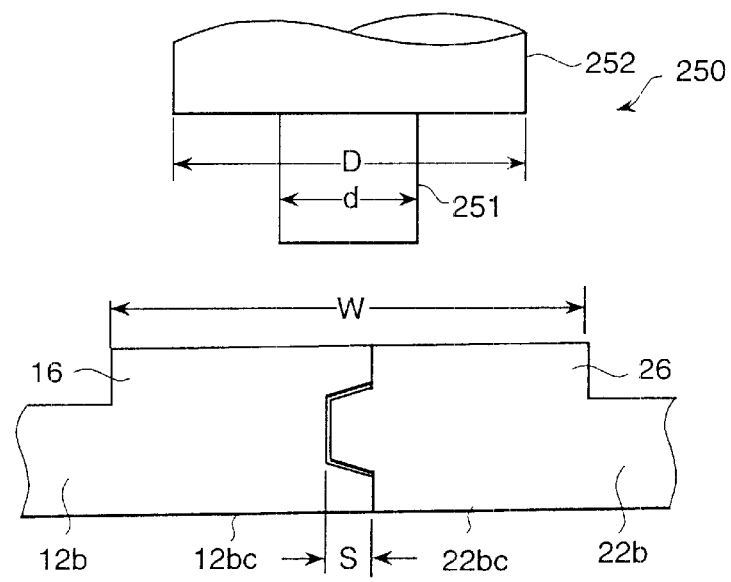
FIG. 3 is a longitudinal cross-sectional view showing the abutting members prior to welding in the embodiment of FIG. 1.

The raised portions 35 which project upwardly are provided at both ends of the connection member 30. The upper face of each raised portion 35 has a V-shaped groove 36 which is arranged at a center of the width of the raised portion 35. The width of the raised portion 35 is larger than the diameter of a large diameter portion 252 of the rotary tool 250, as seen in FIG. 3. The groove 36 is used for position detecting to guide the rotary tool 250. The groove 36 is detected by a laser sensor, and the axial center of the rotary tool 250 is controlled in accordance with the position of the groove 36. On an extension line through the groove 36, namely on the axial center of the rotary tool 250, there is an intersecting point of the two ribs 13A (23A) and rib 13B (23B).

The width of the connection member 30 is smaller than the interval between the face plates 11 and 21 of the two hollow frame member 10 and 20. The connection member 30 is an extruded frame member made of the same material as that of the hollow frame members 10 and 20. The length of the connection member 30 is the same as the length of the hollow frame members 10 and 20.

A distance P, as seen in FIG. 5, from the end portion of the face plate 11 to the end portion of the face plate 21 (a distance from the apex of the truss structure of the end portion of the hollow frame member 10 and the apex of the truss structure of the end portion of the hollow frame member 20) is the same pitch P of the truss structure of the other positions. The faces plates 11 and 12, 21 and 22 represent a side of the truss structure of the hollow frame member which, in combination with the ribs 13, 23, form an isosceles triangle. However, the truss structure at the end portion of the hollow frame members 10 and 20 is not an isosceles triangle. Thus, the rib 13A is connected to a midway point between the center of the truss structure and the end of the face plate 12, and the rib 23B is connected to a midway point between the center of the truss structure and the end of the face plate 22. Between a connection portion between the rib 13A and the face plate 12 and a connection portion between the rib 23A and the face plate 22, a space for inserting the friction stir welding apparatus is formed.

Since the ribs 13A and 23A are more erect (θ 1 is smaller) in comparison with the ribs 13B and 23B, the plate thicknesses of the ribs 13A and 23A are thicker than the plate thicknesses of the ribs 13B and 23B. The plate thicknesses of the ribs 13B and 23B, on the other hand, are thicker than the plate thicknesses of the other ribs 13. The connection portions between the ribs 13A, 13B and 13 and the face plates 11 and 12, 21 and 22 have an arc shape. Further, the thickness of the connection member 30 is determined according to requirements of strength.

Figure 1:
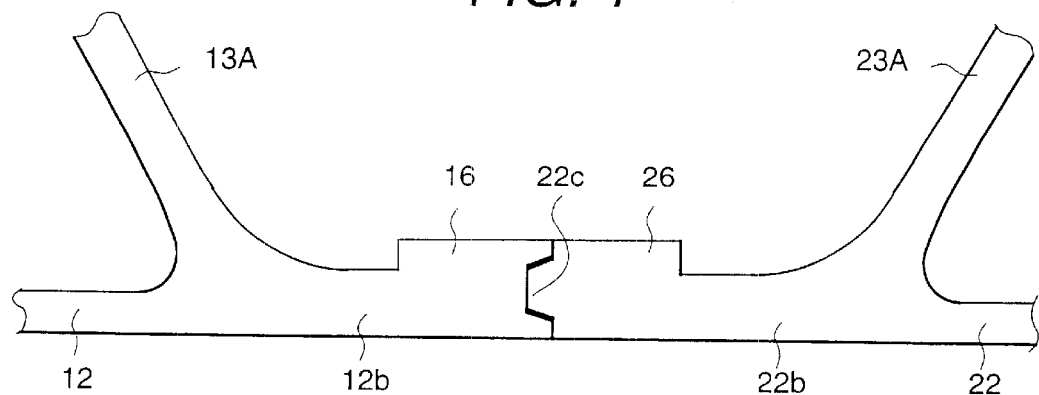
FIG. 1 is a longitudinal cross-sectional view showing an abutting portion of two members to be welded according to one embodiment of the present invention.
Figure 2:
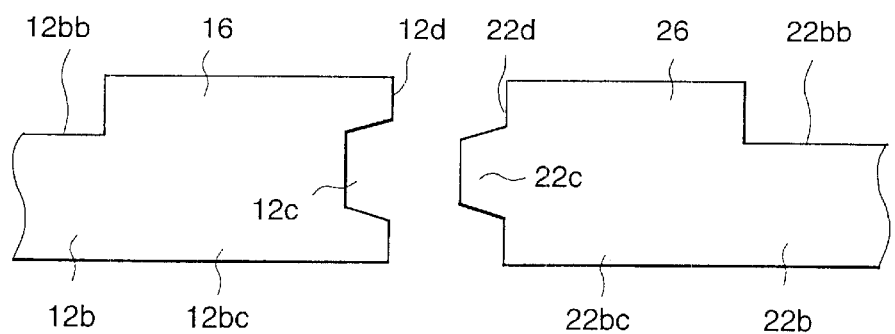
FIG. 2 is a longitudinal cross-sectional view showing the members before being abutted in the embodiment of FIG. 1.

The end portion of the face plates 12b and 22b, namely the construction of the abutted portion, will be explained with reference to FIGS. 1–3. At the end face 22d of the face plate 22b, a trapezoid shaped projecting portion 22c is provided, which projects from the end of the face plate 22b. In the end face 12d at the end portion of the face plate 12b of the hollow frame member 12, a trapezoid shaped recessed portion 12c is provided, and this recessed portion 12c is configured to receive the projecting portion 22c of the face plate 22b. When the projecting portion 22c enters into the recessed portion 12c, the lower faces 12bc and 22bc (the outer face of the car body) of the face plates 12b and 22b are aligned to provide a single continuous surface.

Further, the end faces 12d and 22d of the face plates 12b and 12b come into contact with each other when the face plates are abutted. The end faces 12d and 22d of the face plates 12b and 22b, except for the recessed portion 12c and the projecting portion 22c, are substantially orthogonal to the longitudinal direction of the face plates 12b and 22b. The height and width of the recessed portion 12c are slightly larger than the height and a depth of the projecting portion 22c. The upper portions of the recessed portion 12c and the projecting portion 22c are formed above an extension line of the upper faces (the inner face of the car body) 12bb and 22bb of the face plates 12b and 22b. Namely, the upper portions of the recessed portion 12c and the projecting portion 22c are located in the raised portions 16 and 26. The recessed portion 12c and the projecting portion 22c are arranged in the end surface of the face plates 12b and 22b.

The method of manufacturing this structural body will be explained. The hollow frame members 10 and 20 are mounted on the bed 40. Next, the frame members 10 and 20 are moved together until the face plates 12b and 22b are abutted, and the projecting portion 22c at the end of the face plate 22b is inserted into the recessed portion 12c in the face plate 12b. With this arrangement, as seen in FIG. 1, the lower faces (the outer face of the car body) of the face plates 12b and 22b become substantially one continuous surface. When one hollow frame member has a longitudinal distortion in an up and down direction (warp), by pressing this hollow frame member from above, the raised portion 22c can be inserted into the recessed portion 12c. When joining such hollow frame members which have a longitudinal distortion in an up and down direct ion, after abutting the frame members, they will maintain a substantially linear form since the abutting edges are locked together. The outer faces of the face plates 12b and 22b become substantially one continuous surface. In the abutted condition, the end faces 12d and 22d contact or closely approach each other.

Next, these frame members 10 and 20 are fixed on the bed 40 in the assembled state. Then, the portions of the end faces 12d and 22d are fixed temporally by arc welding. This temporary welding is carried out intermittently at spaced positions along the weld line.

An upper surface of the bed 40 on which the abutted portion of the face plates 12b and 22b is mounted is flat. Three portions which are in the vicinity of the abutted portion of the face plates 12b and 22b, namely a cross-point in the vicinity of the ribs 13A and 23A on the face plates 12b and 22b, and a cross-point in the vicinity of the ribs 13B and 23B and the face plates 12 and 22, are mounted on the bed 40 having the same height.

Under this condition, the rotary tool 250 of the friction stir welding apparatus is inserted from above into the joint between the raised portions 16 and 26, and the rotary tool 250 is moved along the welding line so that friction stir welding is carried out. The axial center of the rotary tool 250 is aligned in a perpendicular direction (the direction along the normal line of the welding joint). However, in the advancing direction of the rotary tool 250, the axial center thereof is inclined, as is already known.

The rotary tool 250 comprises the large diameter portion 252 and the small diameter portion 251 at a tip end of the large diameter portion 252. The tip end of the small diameter portion 251 of the rotary tool 250 is positioned below the upper faces of the face plates 12b and 22b. Namely, a lower end of the large diameter portion 252 of the rotary tool 250 is spaced from the lower end of the projecting portion 12c so as to be positioned between the surface formed by the apex of the raised portions 16 and 26 and the plane of the face plates 12b and 22b of the car inner side (the face side of the plates 11 and 21). A diameter of the large diameter portion 252 of the rotary tool 250 is smaller than the combined width of the two raised portions 16 and 26. The small diameter portion 251 of the rotary tool 250 forms a screw member. The diameter of the small portion 251 is larger than a depth S of the recessed portion 12c. With this construction, the material which forms the recessed portion 12c and the projecting portion 22c of the abutted portion is stirred by the rotary motion of the small diameter portion 251. As shown in FIG. 2, the end face 12d is positioned at one-half of the depth S of the recessed portion 12c, and the axial center of the rotary tool 250 is positioned in substantial alignment with the end face 12d, as seen in FIG. 3.

During the friction stir welding, the face of each of the raised portions 16 and 26 is pressed down by rollers which move together with the rotary tool 250.

The raised portion 16 and 26 are detected by a laser sensor. In this way, the position of the raised portions 16 and 26 is determined and the necessary insertion amount of the rotary tool is determined. Further, a gap (between the end faces 12d and 22d) of the abutted portion of the two raised portions 16 and 26 is similarly detected, and the axial center of the rotary tool 250 is positioned to coincide with this gap.

According to this friction stir welding, the gaps formed between the abutted ends of the face plates 12b and 22b (a gap formed between the end faces 12d and 22d, and a gap formed the recessed portion 12c and the projecting portion 22c) are buried and joined The original material of the metal for burying the gap is derived from the raised portions 16 and 26. The outer face side (the outer car side) of the abutted portion is joined so as to produce a flat surface. To the outer face side of the face plates 12b and 22b, there is no recessed portion and no step-wise difference at the welding line.

The upper face of the raised portions 16 and 26 takes on a convex form as a result of the action of the large diameter portion 252 of the rotary tool 250. Thus, at both ends of the recessed portion, a part of the raised portions 16 and 26 is left.

Next, the connection member 30 is mounted so as to be supported on the seat 17 of the face plate 11 and on the seat 27 of the face plate 21. Next, the end portion of the connection member 30 is fixed temporally to the face plates 11 and 21 using arc welding. This temporary welding is carried out intermittently at spaced points.

Next, using the friction stir welding apparatus which was used to friction stir weld the abutted portions of the face plates 12b and 22b, the welding of the connection member 30 to the seats 17 and 27 is carried out. Under a condition where the rotary tool 250 is inserted at a position where the connection member 30 and the seat 27 are overlapped, the rotary tool 250 is moved along the welding line and friction stir welding is carried out.

A width of the raised portion 35 on the connection member 30 is larger than the diameter of the large diameter portion 252 of the rotary tool 250. At a center of the raised portion 35, a groove 36 is provided. The rotation axial center of the rotary tool 250 is positioned to coincide with the groove 36. The tip end of the small diameter portion 251 of the rotary tool 250 is inserted deeply into the groove 36 to the seats 17 and 27. With this construction, the overlapping welding is carried out. The lower end of the large diameter portion 252 of the rotary tool 250 is located between plane of the upper face of the connection member 30 at the non-raised portion and the surface of the raised portion 35 during welding.

The upper face of the raised portion 35 takes on a convex form as a result of the action of the large diameter portion 252 of the rotary tool 250. Thus, at both ends of the recessed portion, a part of the raised portion 35 is left.

The above-stated sensor, which is used for position detection during the friction stir welding, detects the groove 36, so that the rotary tool 250 can be guided along to the groove 36 during welding. The axial center of the rotary tool 250 is positioned at the apex point of the truss structure of the two ribs 13A and 13B (23A and 23B) or passes through a perpendicular line in the vicinity thereof It is to structurally support the pressure which occurs during welding that there is provided an increase in the plate thickness of the ribs 13A and 13B (23A and 23B), a support in the shape of an arc which connects the rib and the face plate, an increased thickness of the connection member 30 and of the seats 17 and 27, etc.

The welding of the connection member 30 is carried out first by welding the connection member 30 to the seat 17, and next the welding of the connection member 30 to the seat 27 is carried out. When two rotary tools are used, the welding of both ends of the connection member 30 can be carried out at the same time. According to this procedure, the welding of both faces of the hollow frame member is carried out from one side face. For this reason, it is unnecessary to reverse the structural body to effect welding of both faces. Accordingly, the structure can be manufactured at a low cost and with a high accuracy. Further, the outer surfaces of the face plates 12b and 22b can be joined to produce a flat surface.

The raised portions 16, 26 and 35 of the structural body are arranged at the inner side of the car body and do not exist at a portion (the outer face side, the car outer side) where a flat face is required. Further, at the car outer side, there is no raised portion which needs to be removed using a rotary tool. For this reason, the removal of the raised portion is unnecessary, and so the car body can be manufactured at a low cost.

Further, since the abutted portion of the face plates 12b and 26b are effectively locked together by the recessed portion 12c being engaged by the projecting portion 22c, the two face plates 12b and 22b become as one body, whereby the outer face of the two members which make up the one body become substantially the same face. For this reason, there is no step-wise difference at the edges of the two members as in the prior technique, so that, after the friction stir welding, a machining of the outer face of the panel becomes unnecessary. Further, since the plate thickness of the face plates 11b and 22b is not reduced, the frame member can be made as a light weight structure. Of course, some machining can be carried out according to demand.

The projecting portion 22c has a trapezoidal shape, so that this projecting portion 22c can enter easily into the recessed portion 12c. The size of the tip end of the projecting portion 22c also can be formed to have a smaller shape than the side of the end face 22d, for example a triangle shape. On the other hand, with the similar aim, the bottom of the recessed portion 12c can be formed to have a smaller shape than the side of the end face 12d, for example a triangular shape.

At the abutted portion of the face plates 12b and 22b, in view of the provision of the raised portions 16 and 26, the gap between the projecting portion 22c and the recessed portion 12c can be billed in and compensated by the additional metal.

The axial center of the rotary tool 250 can be positioned in alignment with the end face 12d (22d) of the face plate. However, when a position of a half of the depth of the recessed portion 12c is a target position of the axial center of the rotary tool 250, the diameter of the small diameter portion 251 of the rotary tool 250 can be made small.

Since the end portion of the face plate is thick due to the raised portions 16 and 26, at the end portion of the face plate, the recessed portion 12c and the projecting portion 22c can be provided easily. Accordingly, the raised portions 16 and 26 can be utilized effectively.

The position for mounting the connection member 30 can be set at the portion which can bear the load during the friction stir welding. For example, the structure and the portion can be set as shown in FIG. 9 of the above stated Japanese application patent laid-open publication No. Hei 9-309164 (EP 0797043A2).

The frame member described in the foregoing embodiment is a hollow frame member, however a hollow member is not unnecessary. Further, to the face plates 12, 12b and 22, 22b, only a single rib need be provided. Also, the bed 40 can be replaced by a backing member, such as a roller etc. Further, the member which is joined in the above stated manner can be used as an outer face (a face to be viewed by the eye) of the structural member, such as a building structure.

The technical range of the present invention is not limited by the specific language defined in each claim or the stated means for solving the problems of the prior art; and, further, it also includes a range of which the man of ordinary skill in this technical field would find equivalent.

According to the present invention, after the engagement of the abutted portions of the plates of the frame members, since the friction stir welding can be carried out and the plates can be joined with no step-wise difference therebetween.

What is claimed is:

1. A friction stir welding method comprising the steps of:
   inserting a projecting portion of an end portion of a plate of a first frame member into a recessed portion of an end portion of a plate of a second frame member, wherein at the end portions of each of said respective plates a raised portion, which protrudes in a thickness direction of the first and second frame members, is provided, and wherein the recessed portion extends into one of the raised portions, and the projecting portion extends from the other of the raised portions; and at said insertion-into portion, inserting a rotary tool from one face side of said plate into the raised portions, from a side of the raised portions, and carrying out flatly a friction stir welding, to another face side of said plate.

2. A friction stir welding method according to claim 1, further comprising positioning an outer diameter portion of said rotary tool which is inserted into said insertion-into portion to a position which is deeper than a bottom of said recessed portion.

3. A friction stir welding method according to claim 1, wherein said friction stir welding is carried out using a rotary tool in which the diameter of said rotary tool positioned at said recessed portion is larger than the depth of said recessed portion.

4. A method of manufacturing a structural body comprising the steps of:

inserting a projecting portion of an end portion of a plate of a first frame member into a recessed portion of an end portion of a plate of a second frame member, wherein at the end portions of each of said respective plates a raised portion, which protrudes in a thickness direction of the first and second frame members, is provided, and wherein the recessed portion extends into one of the raised portions, and the projecting portion extends from the other of the raised portions;

at said insertion-into portion, inserting a rotary tool from one face side of said plate into the raised portions, from a side of the raised portions, and carrying out flatly a friction stir welding on another face side of said plate; and positioning a face of said one side of a structure which has been obtained by the friction stir welding as an outer face of a structural body.

5. A method of manufacturing a car body comprising the steps of:

inserting a projecting portion of an end portion of a plate of a first frame member into a recessed portion of an end portion of a plate of a second frame member, wherein at the end portions of each of said respective plates a raised portion, which protrudes in a thickness direction of the first and second frame members, is provided, and wherein the recessed portion extends into one of the raised portions, and the projecting portion extends from the other of the raised portions;

at said insertion-into portion, inserting a rotary tool from one face side of said plate into the raised portions, from a side of the raised portions, and carrying out flatly a friction stir welding on another face side of said plate; and positioning a face of said one side of a structure which has been obtained by the friction stir welding as an outer face of a car body.

6. A friction stir welding method according to claim 1, wherein said projecting portion and said recessed portion have corresponding trapezoid or triangle shapes.

7. A friction stir welding method according to claim 1, wherein when the projecting portion is inserted into the recessed portion, faces of the first and second frame members, opposite the face at said one face side, are aligned to form a continuous surface.

8. A friction stir welding method according to claim 1, wherein the rotary tool has a smaller-diameter portion and a larger-diameter portion, the smaller-diameter portion extending toward the plates of the first and second frame members from the larger-diameter portion, and wherein a diameter of the smaller-diameter portion is greater than a depth of the recessed portion.

9. A friction stir welding method according to claim 1, wherein the rotary tool has a smaller-diameter portion and a larger-diameter portion, the smaller-diameter portion extending toward the plates of the first and second frame members from the larger-diameter portion, and wherein a diameter of the larger-diameter portion is smaller than a total width of the raised portions.

10. A friction stir welding method according to claim 1, wherein the rotary tool is inserted such that an axial center of the rotary tool is positioned aligned with end faces of the first and second frame members.

* * * * *